United States Patent [19]
Alves

[11] Patent Number: 5,808,865
[45] Date of Patent: Sep. 15, 1998

[54] COMPUTER DRIVE CASE WITH MULTIPLE OPENINGS FOR ACCESSING DRIVE

[75] Inventor: Kasidy W. Alves, Oxnard, Calif.

[73] Assignee: Scosche Industries, Inc., Oxnard, Calif.

[21] Appl. No.: 871,869

[22] Filed: Jun. 9, 1997

[51] Int. Cl.[6] .......................... G11B 33/02; B65D 85/38; G06F 1/16
[52] U.S. Cl. .................. 361/685; 361/683; 206/305; 206/320; 206/576
[58] Field of Search .................................. 361/683, 685; 206/305, 320, 576; 190/111, 112, 119; 383/97; 150/117, 118

[56] References Cited

U.S. PATENT DOCUMENTS

| | | | |
|---|---|---|---|
| 4,458,813 | 7/1984 | Tushinsky et al. | 206/320 |
| 4,669,001 | 5/1987 | Thrush | 206/320 X |
| 5,494,157 | 2/1996 | Golenz et al. | 190/111 X |
| 5,706,940 | 1/1998 | Amarello | 206/320 |
| 5,725,090 | 3/1998 | Vermillion et al. | 190/111 X |

FOREIGN PATENT DOCUMENTS 2178401  2/1987  United Kingdom ................... 190/111

*Primary Examiner*—Michael W. Phillips
*Attorney, Agent, or Firm*—William W. Haefliger

[57] ABSTRACT

A method of protecting a disc or tape drive unit having ports for wiring connections to a power source and to a computer, that includes providing a flexible, protective case for the drive unit, and providing adjustable windows in the case; locating the drive unit in the case to locate the ports in juxtaposition to said windows; passing the wiring connections through the windows, and to the ports to establish wiring connections to the power source and to the computer.

26 Claims, 4 Drawing Sheets

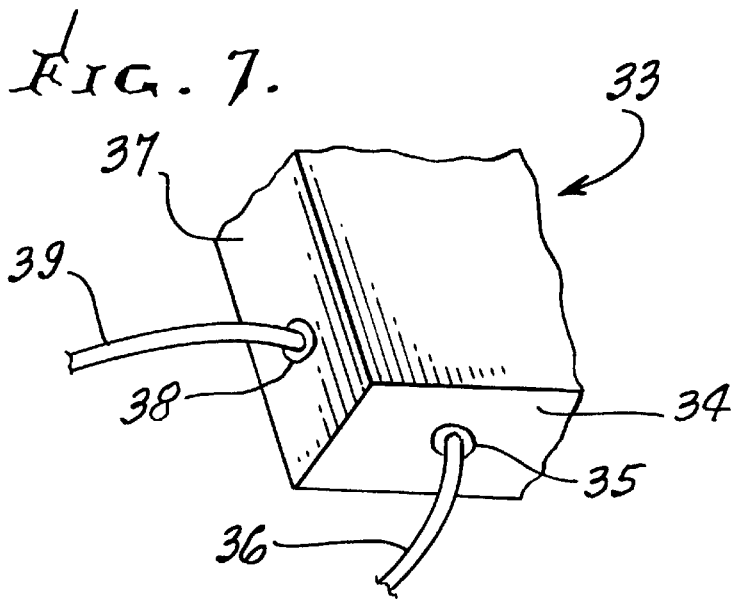
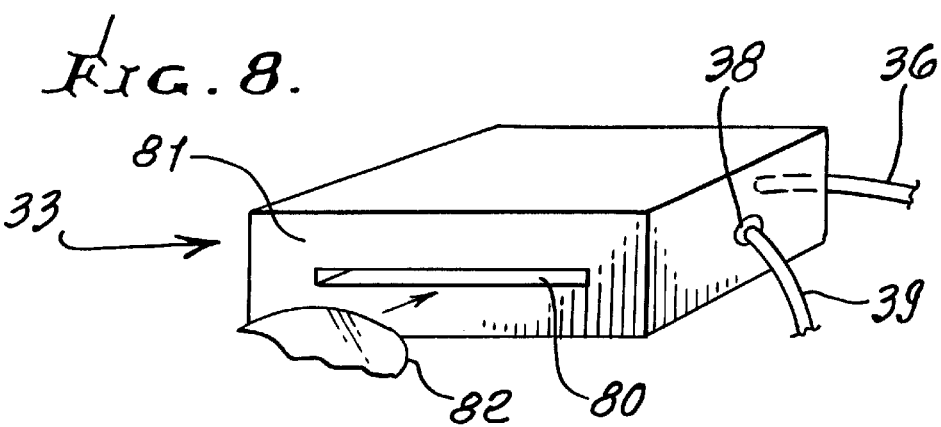
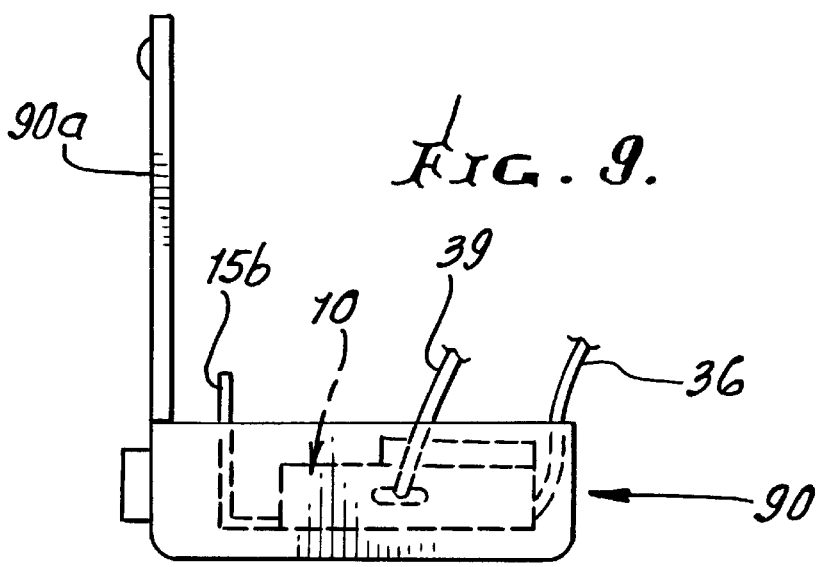

COMPUTER DRIVE CASE WITH MULTIPLE OPENINGS FOR ACCESSING DRIVE

BACKGROUND OF THE INVENTION

This invention relates generally to transportation and use of magnetic tape drives, or magnetic disc drives; and more particularly, it concerns provision of a protective utility case for such a drive, enabling its use while the drive remains protected in its utility case.

Tape or disc drives are connectable to computer units, and operable to transmit data between tape or disc media and memory, or processing circuitry, at the computer unit. Previously, it was known to transport or move the drive while it was not protected, or if the drive was carried in a receptacle, it had to be removed from the receptacle for use. In either event, the drive became unprotected at some point between its transportation and use. Accordingly, there is need to provide means whereby the drive, including its housing, may remain protected during both transportation and use.

Also, there is need for a drive case having the advantageous structures, multiple modes of operation and use, and which affords the surprising results, as are now enabled or provided by the present invention.

SUMMARY OF THE INVENTION

It is a major object of the invention to provide an improved and highly useful protective case, for a tape drive or a disc drive, as referred to. Access to such a drive is normally had at housing ports, to enable wiring connection to a power source and to a computer unit. Accordingly, the invention contemplates:

a) providing a flexible, protective case for the drive unit, and providing adjustable windows in the case,
  b) locating the drive unit in the case to locate the ports in juxtaposition to the windows,
  c) passing the wiring connections through the windows, and to the ports to establish wiring connections to the power source and to the computer.

It is another object to provide a protective closure flap on the case to extend over a disc receptacle opening in the unit, and opening the flap to allow entry of a disc into the opening.

A further object is to provide a first pocket in the case and to receive the drive unit, and a second pocket in the case to receive a power supply connection plug. That plug is typically electrically connectable to the drive, via one of the windows in the case. Another of the windows in the case passes a cable that connects to the computer unit to which data is to be transmitted.

Yet another object is to provide means at one or both windows for adjustably closing that window. Opening of the window also gives ready access to the housing port or ports to which the wiring or cable is or are connectable, as for adjustment of such connections, while the drive remains in the case.

An additional object is to provide the window adjustable closure means in the form of one or more zipper closures for the windows.

A further object is to provide a barrier in the case to extend between the pockets or compartments, and to form a common wall of the pockets. Means may also be provided in the case whereby the barrier may be adjustably attached to the case to vary the sizes of the pockets. The pockets thus formed may advantageously be shaped to have generally rectangular cross sections, for ease of reception of the drive housing and of the plug.

A yet further object is to provide a flexible, durable case, with sturdy sides and end walls, and supporting an additional external pocket or pockets, the layered material of which provides additional protection for the contained drive and plug.

These and other objects and advantages of the invention, as well as the details of an illustrative embodiment, will be more fully understood from the following specification and drawings, in which:

DRAWING DESCRIPTION

FIG. 7 is a fragmentary perspective view of a disc drive housing showing wiring ports at the side and end of the housing;

FIG. 8 is a perspective view of the disc drive housing showing a disc reception slot at the front of the housing; and FIG. 9 shows in side elevation a laptop computer housing containing the case.

DETAILED DESCRIPTION

Figure 1:
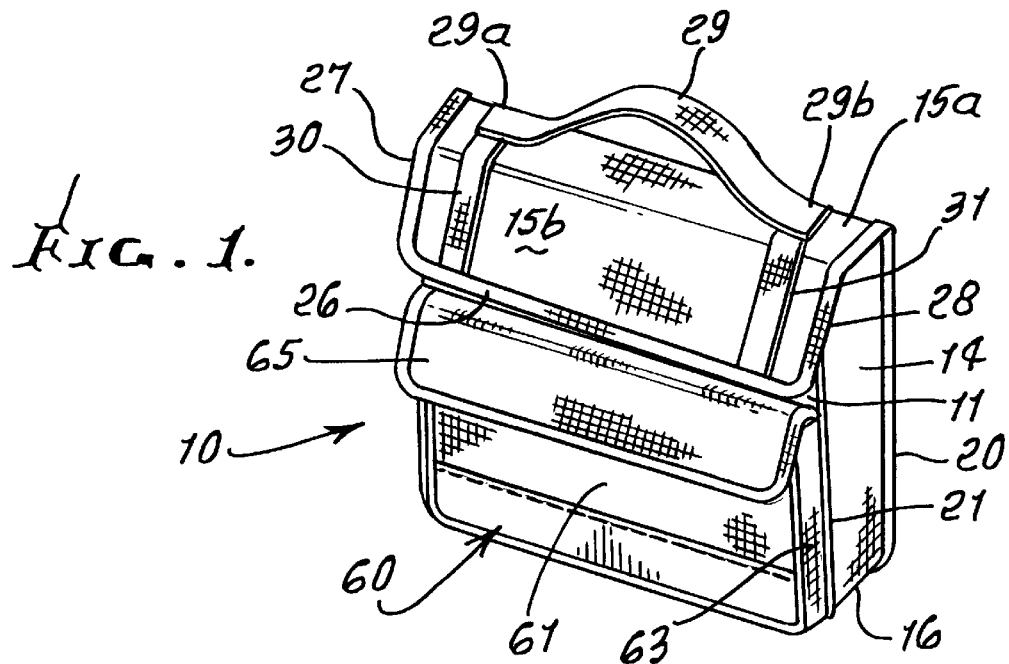
FIG. 1 is a perspective view of a flexible, protective case embodying the invention.

The case 10, as shown in the drawings, has a front wall 11, rear wall 12, side walls 13 and 14, cover 15, including a top wall 15a, and flap 15b, and a bottom wall 16. Each wall may be reinforced with an adjacent auxiliary wall panel, as indicated, for example, at 11a, 12a, and 13a, for walls 11, 12, and 13. All of the walls consist of durable, protective, flexible, plastic fabric or material, such as VYLON (NYLON-embossed vinyl).

Protective beading may be provided at case edges, as for example is indicated at 20, 21, 22, 23, 24, 25, and flap edges 26, 27, and 28. A handle 29 is joined to the cover at 29a and 29b, adjacent the top wall; and reinforcing bands 30 and 31 extend as shown.

Figure 3:
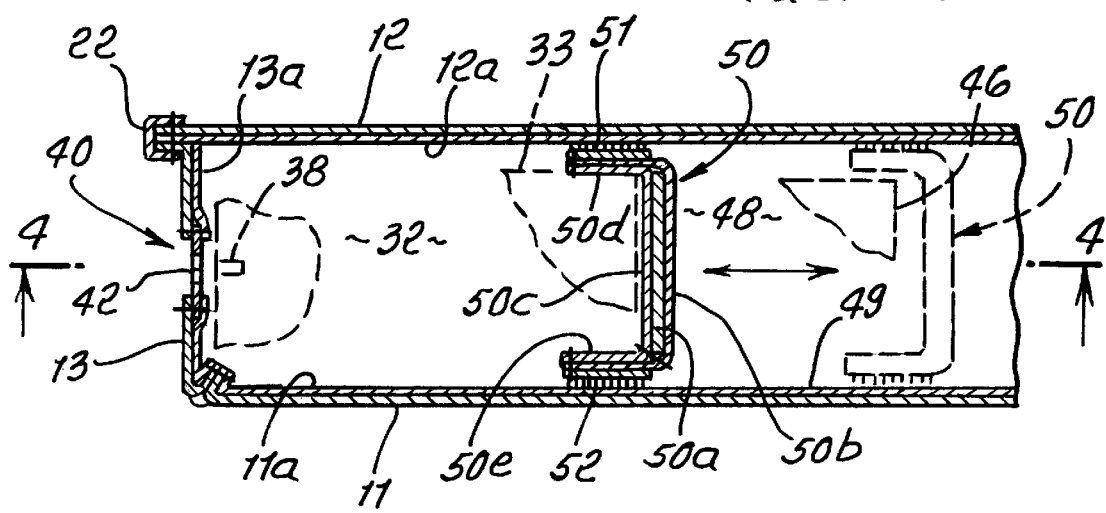
FIG. 3 is an enlarged fragmentary section taken through the case showing compartments therein.
Figure 4:
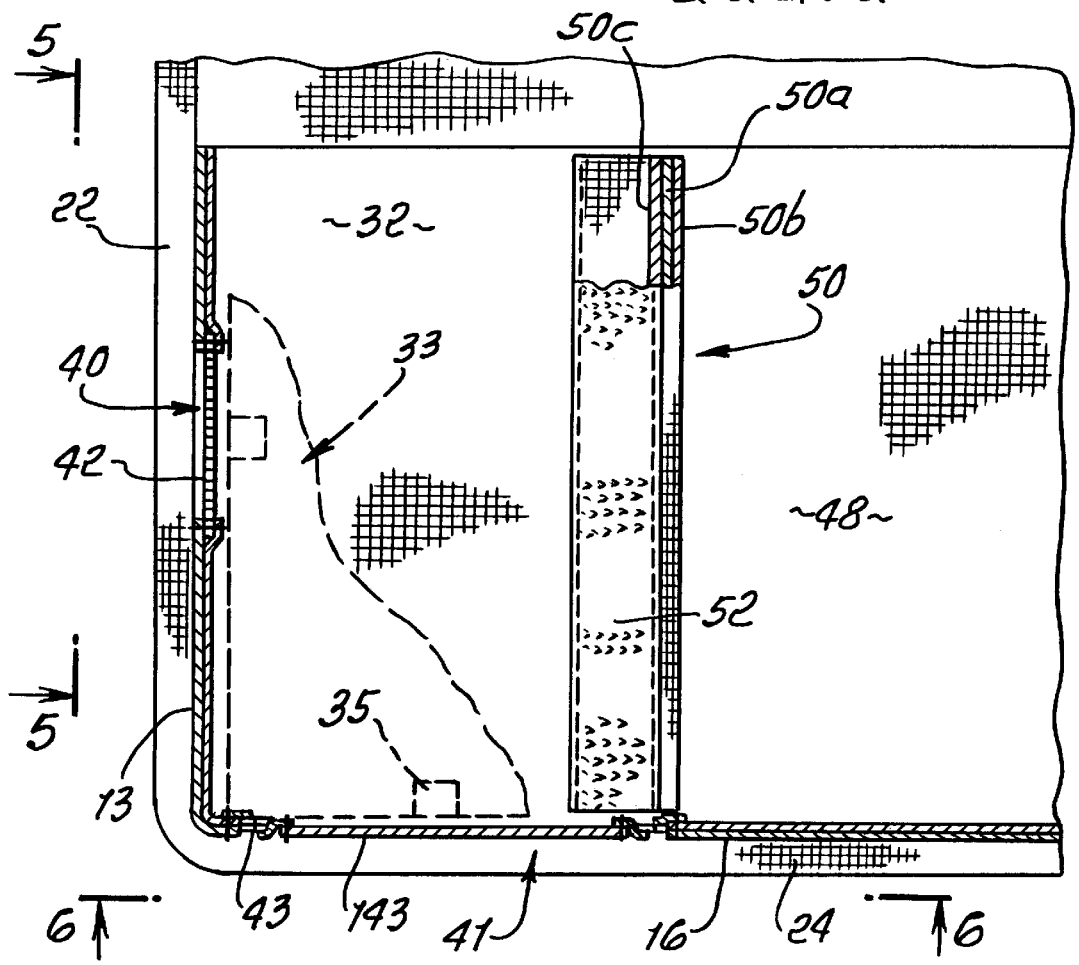
FIG. 4 is an enlarged fragmentary section taken on lines 4—4 of FIG. 3.
Figure 5:
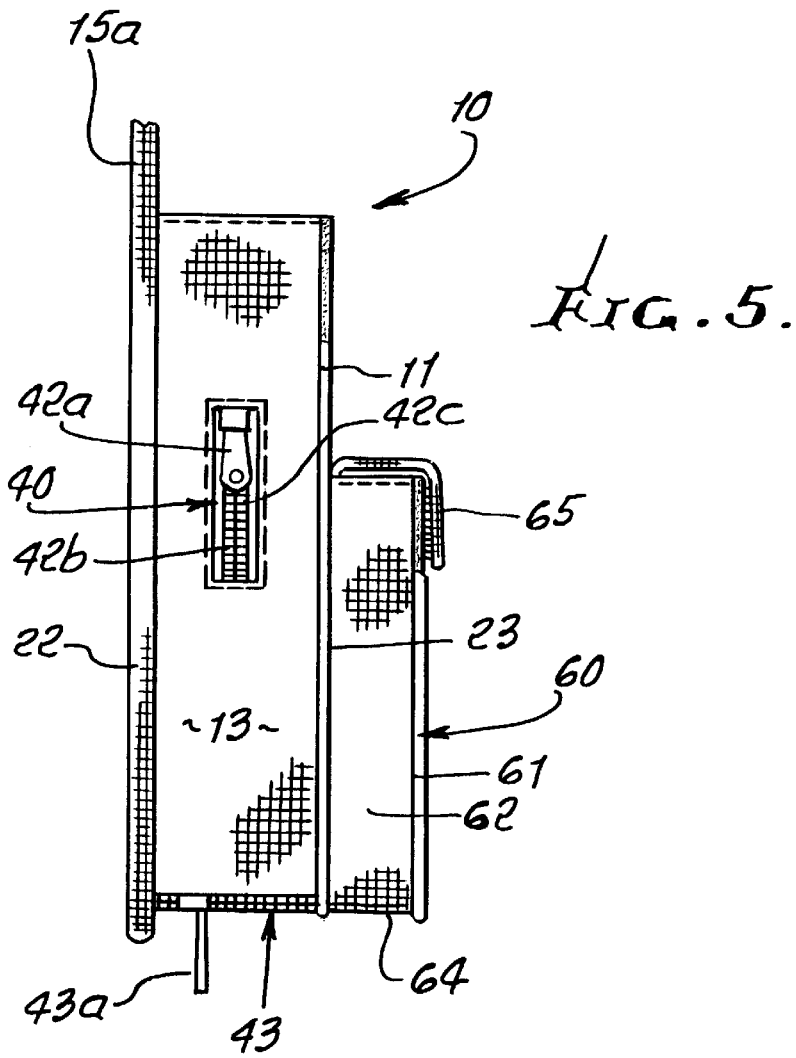
FIG. 5 is a side view of the case taken on lines 5—5 of FIG. 4.
Figure 6:
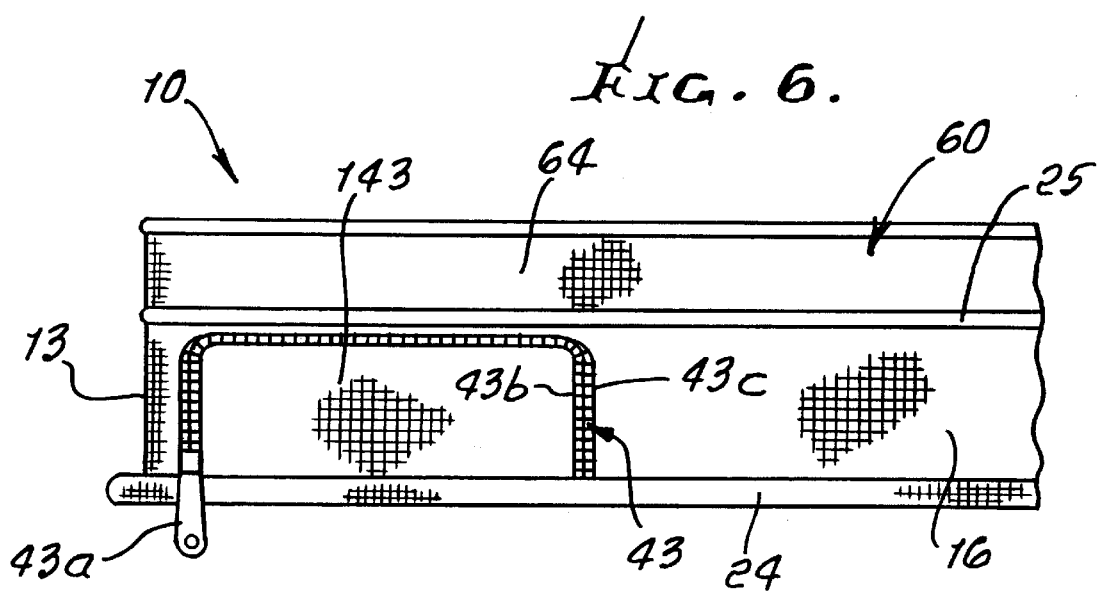
FIG. 6 is a bottom view of the case taken on lines 6—6 of FIG. 4.

The rectangular cross section compartment 32, as seen in FIG. 3, is adapted to removably receive a disc drive metallic housing 33, which is better seen in FIG. 7. That housing has an end wall 34 containing a port 35 for a plug-in cable connector seen at 36 in FIG. 7; and a side wall 37 that contains a port 38 for a plug-in wire connector seen at 39. The case 10 provides ready access to such ports, while the disc drive housing is in its compartment 32, to enable connection of the connectors to the disc drive.

In accordance with important aspects of the invention, adjustable windows are provided in the case walls, as in walls 13 and 16, the windows being closable for protection of the drive unit, as during transportation of the case. The windows are openable to allow passage of the wiring and/or cable connectors through the windows to connect to the drive at ports, such as ports 35 and 38, as referred to, during use of the disc drive. As shown, the window 40 is provided in wall 13 to provide access to port 38, and another window 41 is provided in wall 16, to provide access to port 35, the ports registering with the windows.

Further, means is provided at at least one of the windows for adjustably closing the window or windows. Such means is shown in the form of zippers 42 and 43 at the windows, the flexibility of the walls facilitating zipper slider movement to close together the zipper tracks. See slide 42a and tracks 42b and 42c at window 40; and slide 43a and U-shaped tracks 43b and 43c at window 41, and forming a foldable flap closure 143. Use of the zippers also allows partial adjustable closure of the windows, while the wires 36 and 39 pass through the windows to the ports, for enhanced protection.

Figure 2:
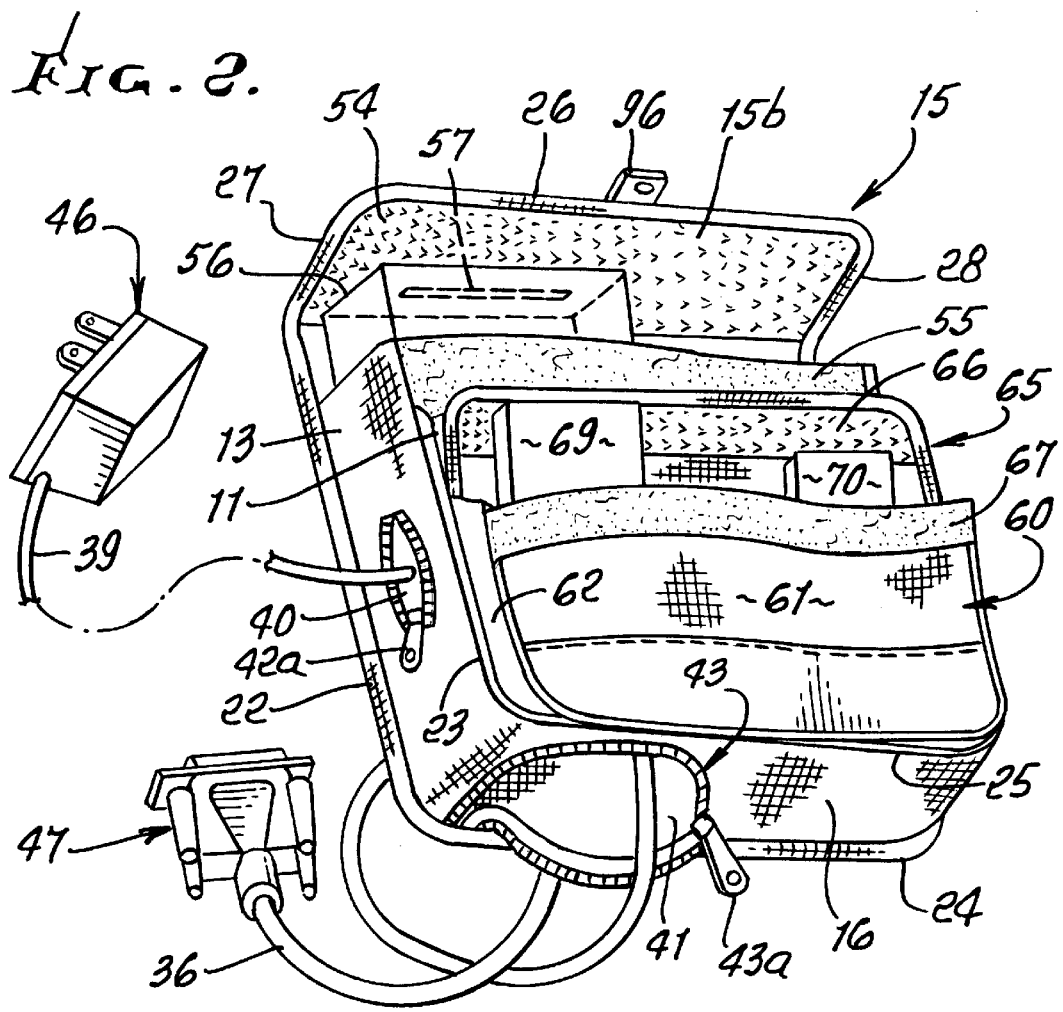
FIG. 2 is an enlarged perspective view of the case showing windows in the case giving wiring access to ports at disc or tape drive equipment in the case.

FIG. 2 also shows plugs 46 and 47 at the ends of wire 39 and cable 36, respectively. Plug 46 connects to a power source, such as a 120-volt wall receptacle; and plug 47 connects to a computer monitor, or circuitry including memory, for example.

Compartment 48 in the case interior section 49 is adapted to removably receive plug 46, for storage, as shown. A barrier 50 extends between the compartments 32 and 48, and includes a partition 50a between flexible fabric layers 50b and 501c. The turned ends 50d and 50e of the barrier have VELCRO hook and loop attachment at 51 and 52 to the inner auxiliary walls panels 11a and 12a, as shown, whereby the sizes of the compartments 32 and 48 may be adjusted by shifting of the barrier position.

Flap 15b has VELCRO hook and loop attachment to the case, as via hook and pile layers 54 and 55. When the flap is opened, as in FIG. 2, the end wall 56 of the drive housing is exposed, for disc insertion into the housing via entrance slot 57. See also FIG. 8. The case 10, as described, provides the preferred form.

An additional and smaller case 60 may be attached to wall 11, as shown, to overlie the interior of case 10. Case 60 includes a front wall 61, end walls 62 and 63, a bottom wall 64, and a top flap 65 foldable, as seen in FIGS. 1 and 2, to have VELCRO hook and loop attachment at 66 and 67 to the wall 61. It may contain auxiliary equipment related to use of the drive, as indicated by writing pads 69 and 70.

In FIG. 8, slot 80 in end wall 81 of the housing 33 is adapted to receive a compact disc 82, while the housing is in the case 10.

In FIG. 9, a laptop computer hard housing 90 contains or receives the present case 10, for further ease of transport, use and protection. The housing lid 90a extends upwardly in open condition; and the case flap 15b also extends upwardly to provide access to the drive, for use.

FIG. 2 also shows lock component 96 on the flap 15b, to lock to a corresponding component on front wall 11, for locking the flap in closed position.

I claim:

1. The method of protecting a disc or tape drive unit having ports for wiring connections to a power source and to a computer, which includes
    a) providing a flexible, protective case for said drive unit, and providing adjustable windows in said case,
    b) locating the drive unit in the case to locate said ports in juxtaposition to said windows,
    c) passing said wiring connections through said windows, and to said ports to establish wiring connections to the power source and to the computer.

2. The method of claim 1 including providing a protective closure flap on said case to extend over a disc receptacle opening in said unit, and opening said flap to allow entry of a disc into said opening.

3. The method of claim 2 including providing means for releasably locking said flap to said case in flap closed position extending over said drive unit in the case.

4. The method of claim 1 including providing a first compartment in said case for said unit, and a second compartment in said case for a power supply plug electrically connectable to said unit via one of said windows.

5. The method of claim 4 including storing said plug in said second pocket, while the drive unit is in the first pocket.

6. The method of claim 4 including providing said pockets to have generally rectangular cross section shape.

7. The method of claim 4 including providing a barrier in the case to extend between said pockets and to form a common wall of said pockets.

8. The method of claim 7 including providing means in the case whereby the barrier may be adjustably and internally attached to the case to vary the relative sizes of said pockets.

9. The method of claim 1 including providing means at at least one of said windows for adjustably closing the window or windows.

10. The method of claim 9 wherein said means is provided in the form of one or more zipper closures for said windows.

11. The method of claim 10 wherein one of said zipper closures has U-shape, when closed, to form a foldable closure flap in the case wall when the zipper is opened.

12. The method of claim 1 including providing an additional case attached to said drive unit case, to overlie the interior of the drive unit case.

13. The method of claim 1 including a laptop computer-sized protective housing in which said case is stored.

14. Apparatus for protecting a disc or tape drive unit having ports for wiring connections to a power source and to a computer, which comprises
    a) a flexible, protective case for said drive unit, there being adjustable windows in said case,
    b) the drive unit located in the case to locate said ports in juxtaposition to said windows,
    c) said wiring connections passed through said windows, and to said ports to establish wiring connections to the power source and to the computer.

15. The apparatus of claim 14 including a protective closure flap on said case that extends over a disc receptacle opening in said unit, and said flap being operable to allow entry of a disc into said opening.

16. The apparatus of claim 15 including locking means for releasably locking said flap to said case, in flap closed position extending over said drive unit in the case.

17. The apparatus of claim 14 including a first compartment in said case for said unit, and a second compartment in said case for a power supply plug electrically connectable to said unit via one of said windows.

18. The apparatus of claim 17 including said plug stored in said second pocket, while the drive unit is in the first pocket.

19. The apparatus of claim 17 wherein said pockets have generally rectangular cross section shape.

20. The apparatus of claim 17 including a barrier in the case extending between said pockets forming a common wall of said pockets.

21. The apparatus of claim 20 including means in the case whereby the barrier may be adjustably and internally attached to the case to vary the relative sizes of said pockets.

22. The apparatus of claim 14 including means at at least one of said windows for adjustably closing the window or windows.

23. The apparatus of claim 22 wherein said means comprise one or more zipper closures for said windows.

24. The apparatus of claim 23 wherein one of said zipper closures has U-shape, when closed, to form a foldable closure flap in the case wall when the zipper is opened.

25. The apparatus of claim 14 including an additional case attached to said drive unit case, to overlie the interior of the drive unit case.

26. The apparatus of claim 14 including a laptop computer-sized protective housing in which said case is stored.

\* \* \* \* \*